Aug. 3, 1965  L. J. BUCKLEY  3,198,377
MIXING BOWL WITH HANDLE
Filed April 30, 1962
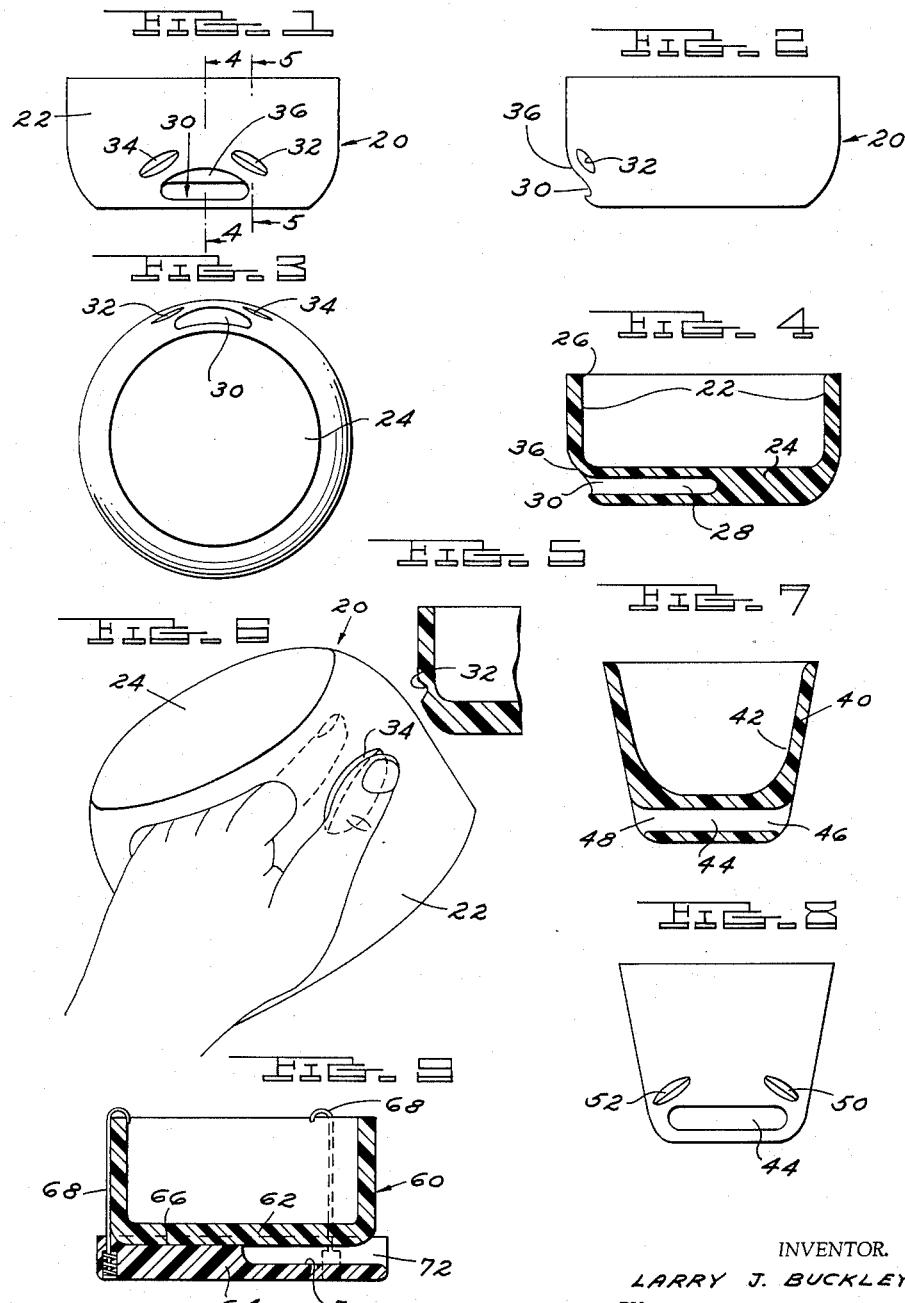
INVENTOR.
LARRY J. BUCKLEY
BY
Barnes, Kisselle, Raisch & Choate
ATTORNEYS United States Patent Office 3,198,377
Patented Aug. 3, 1965

3,198,377
MIXING BOWL WITH HANDLE
Larry J. Buckley, 15587 Deering, Livonia, Mich.
Filed Apr. 30, 1962, Ser. No. 190,904
3 Claims. (Cl. 220—94)

This invention relates to a cooking vessel and more particularly to a vessel which can be handled conveniently with one hand of the user while the other hand is otherwise occupied.

It is an object of the present invention to provide a cooking utensil which is easily inverted by the user. Frequently, a user who is cooking will find his hands wet and a bowl slippery and it almost requires two hands to invert the bowl to pour, for example, a cake batter, from the mixing bowl into the pan and thus it makes it difficult to scrape the bowl out with a spoon or a scraper. On other occasions it is important that the bowl be readily handled with one hand while ingredients are being added or for other reasons.

It is thus an object of the invention to provide a new article of manufacture in the form of a mixing bowl having a shape which allows it to be readily handled. This is accomplished by providing a recess adjacent the bottom of the bowl which accepts a major portion of the hand so that the bowl may be conveniently gripped and lifted, inverted and so forth.

Other objects and features of the invention relating to details of construction and operation will be apparent in the following description and claims.

Drawings accompany the disclosure and the various views thereof may be briefly described as follows:

FIGURE 1, a side elevation of a bowl constructed according to the present invention.

FIGURE 2, a side elevation of the bowl taken at 90° to the view of FIGURE 1.

FIGURE 3, a bottom view of the bowl.

FIGURE 4, a sectional view of the bowl taken on line 4—4 of FIGURE 1.

FIGURE 5, a partial section taken on line 5—5 of FIGURE 1.

FIGURE 6, a view of the bowl in inverted position showing the relationship of the user's hand.

FIGURE 7, a sectional view of a modified construction showing a bowl of slightly different shape.

FIGURE 8, a side view of the bowl shown in FIGURE 7.

FIGURE 9, a view of an attachment for a bowl which can be used to accomplish the purpose of the invention.

Referring to the drawings:

In FIGURES 1 to 6, a bowl 20 is shown having side walls 22, a bottom 24 and a normal opening 26. The bottom wall is thicker than usual and from one side thereof a wide opening 28 enters the bottom, this being formed as a cavity extending a little more than half way through the bowl a little past center. This cavity 28 has an opening 30 with rounded edges so that it readily fits the hand, and on each side of this opening 30 are thumb recesses 32 and 34 respectively. A rounded area 36 accepts the palm of the hand. Thus, as shown in FIGURE 6, an operator's fingers can enter the cavity 28 and the thumb of a person who is using his left hand to hold the bowl will enter the thumb recess 34 to help to steady the bowl. If a person is left handed, he will probably use his right hand in the cavity 28 and his right thumb would fall into the recess 32.

Thus, it will be seen that the person who is using the cooking utensil for mixing a cake or for mixing any kind of a batter or food ingredient mixture can place the fingers of one hand in the cavity 28 and securely hold the bowl regardless of what position it is in. The bowl is easily inverted so that the other hand may be used to clean it out insuring that all of the ingredients are used for the purpose intended. Even when the hands are wet and the bowl is slippery, it is still possible to get a firm and secure grip of it. The vertical height of the cavity is slightly greater than the thickness of the average fingers so that it will fit the hand of most any user. The opening is readily flushed and cleaned and is preferably formed with no sharp corners which might accumulate particles.

In FIGURE 7, a bowl of slightly different shape, having higher side walls 40, is shown having more or less a tapered recess 42 as the main bowl opening. This bowl has a through cavity 44 which may be entered either from an opening 46 on one side or an opening 48 on the other. Thumb recesses 50 and 52 are shown for the same purpose as described in connection with FIGURE 1.

In FIGURE 9, a standard bowl 60, having fairly straight side walls and a flat bottom 62, is shown in cooperation with a second bottom element 64 having a recess 66 for receiving the bottom of the bowl. Spring-biased hooks 68 are disposed 120° apart around the bowl so that the bottom is securely fastened to the bowl and the bottom has a recess 70 with an opening 72 which allows the fingers of an operator to enter the cavity which is formed by the recess 70 together with the bottom surface of the bowl 60. Both of the devices, shown in FIGURES 7, 8 and 9, would operate in substantially the same way as has been described in connection with FIGURE 1. The integral cavity unit is the preferred modification.

In the appended claims, I have attempted to delineate the novelty of my device over known prior art for the purpose of defining the protected area as well as notifying the public relative to the unprotected area. However, I do intend by this claiming to cover any colorable variations, reversal of parts, or equivalents of the device which are within the scope and spirit of this disclosure and not anticipated by the prior art.

I claim:

1. A cooking utensil for facilitating the mixing and blending of cooking ingredients which comprises a relatively wide bowl having a bottom wall and a side wall extending upwardly from said bottom wall to receive and retain cooking ingredients, said bottom wall having a substantially flat supporting surface, said bottom wall being of substantial thickness greater than the thickness of an adult hand, and of substantial width sufficient to receive the four fingers of an adult hand, and means forming a cavity originating at said side wall of the bowl in a direction generally toward the axis of the bowl, said cavity having sufficient width, height and length to receive the four fingers of an adult hand in an extended position to facilitate the use and handling of the utensil with one hand inserted in said cavity.

2. A utensil as defined in claim 1 in which the wall of the utensil adjacent the entrance to said cavity is recessed adjacent one side to provide a thumb hold.

3. A utensil as defined in claim 1 wherein said bottom wall has a removable section and a fixed section which cooperate to define said cavity, and spring biased means extended between said removable section and upper edge of said side wall to retain said removable section in position.

References Cited by the Examiner

UNITED STATES PATENTS

| 995,114 | 6/11 | Clark | 224—48 |
| 2,083,299 | 6/37 | Hunter | 220—1 |

(Other references on following page)

UNITED STATES PATENTS

| | | | |
|---|---|---|---|
| 2,223,271 | 11/40 | Robinson | 273—63 |
| 2,625,020 | 1/53 | Oliver | 220—94 |
| 2,669,736 | 2/54 | Wabnitz | 220—1 |
| 2,772,704 | 12/56 | McConnell et al. | 215—1 |
| 2,802,229 | 8/57 | Bangs | 15—14.3 |
| 2,865,384 | 12/58 | Noon | 215—1 |

FOREIGN PATENTS

| | | |
|---|---|---|
| 81,985 | 9/56 | Denmark. |
| 462,472 | 3/37 | Great Britain. |
| 241,220 | 7/46 | Switzerland. |

THERON E. CONDON, *Primary Examiner.*

EARLE J. DRUMMOND, *Examiner.*